United States Patent
Ferrari

(10) Patent No.: US 6,530,510 B2
(45) Date of Patent: Mar. 11, 2003

(54) GOLF CART CIGAR HOLDER

(76) Inventor: R. Keith Ferrari, 4669 Bethesda Rd., Thompson Station, TN (US) 37179

( * ) Notice: Subject to any disclaimer, the term of this patent is extended or adjusted under 35 U.S.C. 154(b) by 0 days.

(21) Appl. No.: 09/848,566

(22) Filed: May 3, 2001

(65) Prior Publication Data

US 2001/0048012 A1 Dec. 6, 2001

Related U.S. Application Data

(63) Continuation-in-part of application No. 09/568,891, filed on May 11, 2000.

(51) Int. Cl.⁷ .............................................. B60R 11/00
(52) U.S. Cl. ........................ 224/547; 131/175; 131/178; 131/187; 224/183; 224/545; 224/546; 224/555; 224/572
(58) Field of Search ................................ 224/547, 539, 224/545, 546, 555, 918, 183, 572, 901, 901.2, 901.8, 271, 250, 248; 24/3, 303, 306; 131/175, 178, 180, 187; D27/183

(56) References Cited

U.S. PATENT DOCUMENTS

| | | | |
|---|---|---|---|
| 3,638,284 A | | 2/1972 | Baker |
| 3,895,797 A | * | 7/1975 | Moore ................. 128/DIG. 15 |
| 3,923,215 A | * | 12/1975 | Suzuki ........................ 224/183 |
| D246,803 S | | 12/1977 | Steinberg |
| 4,685,477 A | | 8/1987 | Valdez |
| 4,690,316 A | * | 9/1987 | Peterson ..................... 224/270 |
| 4,711,254 A | | 12/1987 | Fleisher et al. |
| 4,838,285 A | | 6/1989 | Petrone |
| 4,909,178 A | | 3/1990 | Le Brocq |
| D317,730 S | * | 6/1991 | Mo ............................... D11/5 |
| 5,025,966 A | * | 6/1991 | Potter ......................... 224/183 |
| 5,143,371 A | * | 9/1992 | Strahan ....................... 15/105 |
| 5,217,294 A | * | 6/1993 | Liston ......................... 224/181 |
| 5,412,545 A | * | 5/1995 | Rising ........................ 2/209.13 |
| 5,440,465 A | * | 8/1995 | Hasness ...................... 362/103 |
| 5,503,316 A | * | 4/1996 | Stewart ....................... 224/312 |
| 5,524,646 A | | 6/1996 | Reich |
| 5,582,337 A | | 12/1996 | McPherson et al. |
| 5,588,448 A | | 12/1996 | Photakis |
| D379,551 S | | 5/1997 | Hubbard |
| 5,643,114 A | | 7/1997 | Marcus |
| D385,059 S | | 10/1997 | Jenkins |
| 5,706,832 A | | 1/1998 | Gold |
| D393,923 S | | 4/1998 | Dimonekas |
| 5,749,504 A | | 5/1998 | Bieker |
| D395,731 S | | 6/1998 | Olis |

(List continued on next page.)

*Primary Examiner*—Stephen K. Cronin
*Assistant Examiner*—Maerena W. Brevard
(74) *Attorney, Agent, or Firm*—Cook, Alex, McFarron, Manzo, Cummings & Mehler, Ltd.

(57) ABSTRACT

A system for removably securing a cigar to a structural member of a golf cart that includes a first strap that carries a first metallic member and includes a fastener for cinching down the first strap so as to releasably secure it to the golf cart. A second strap is provided that has a second metallic member secured thereto and includes a fastener for cinching down the second strap to releasably secure it to the cigar. The fasteners for the first and second straps may be Velcro, a releasable adhesive, a buckle, or the like. At least one of the first or second metallic members is magnetized and the other is of a metal that is magnetizable, so that when the first strap is secured to the golf cart and the second strap is secured to the cigar, the cigar can be firmly, but removably, secured to the golf cart due to the attraction between the first and second metallic members. The first and second straps may also include support members for carrying the respective metallic members, and the first support member may include a projection shape to receive the second support member.

18 Claims, 3 Drawing Sheets

U.S. PATENT DOCUMENTS

| | | |
|---|---|---|
| 5,794,767 A | 8/1998 | Wilson |
| D400,298 S | 10/1998 | Vignerot |
| D401,379 S | 11/1998 | Goldoftas |
| D405,224 S | 2/1999 | Falconio |
| 5,868,143 A | 2/1999 | Nielsen |
| 5,873,471 A | 2/1999 | Ruggeri |
| D406,386 S | 3/1999 | Kuniansky et al. |
| D408,582 S | 4/1999 | Varn |
| 6,049,953 A | 4/2000 | McCay et al. |
| 6,234,179 B1 * | 5/2001 | Alcaraz ...................... 131/178 |
| 6,397,390 B1 * | 6/2002 | Henderson et al. ............ 2/115 |

* cited by examiner

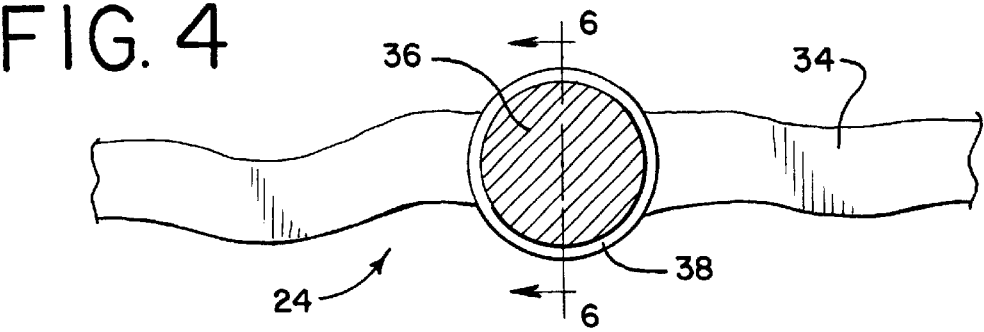
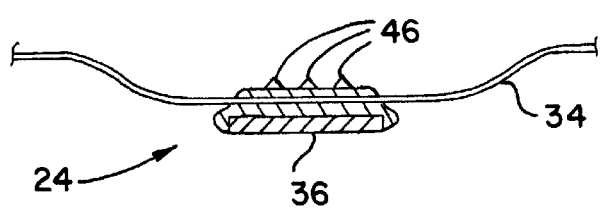
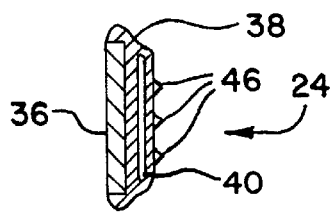
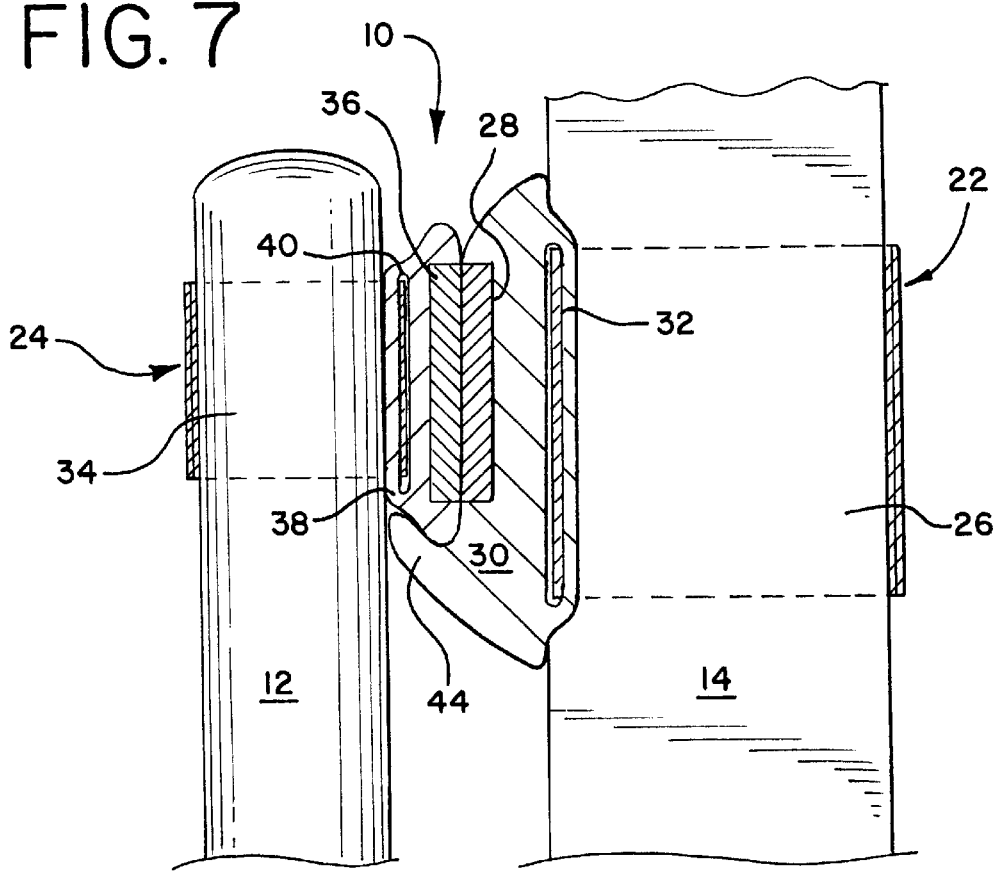

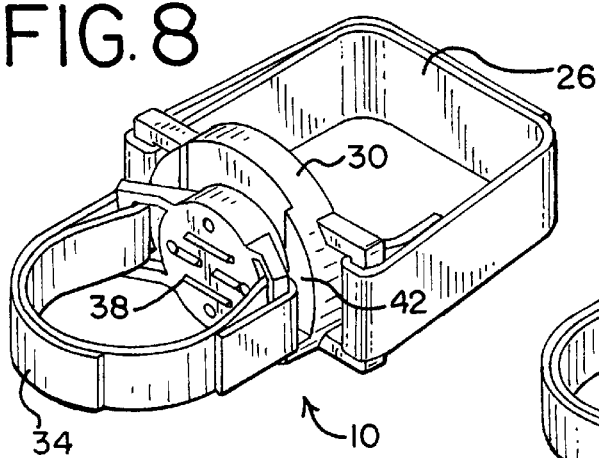
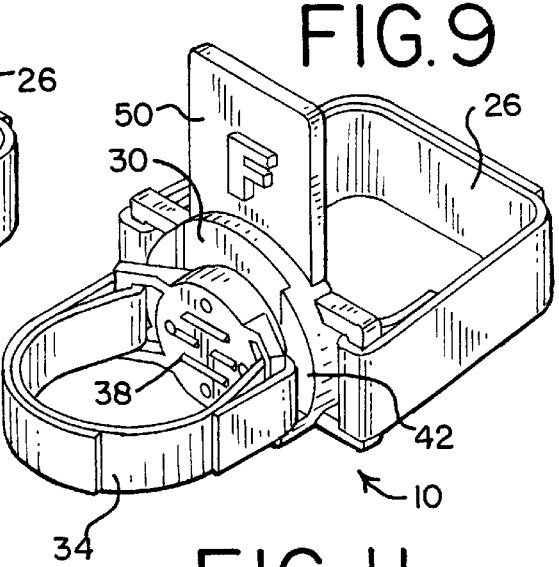
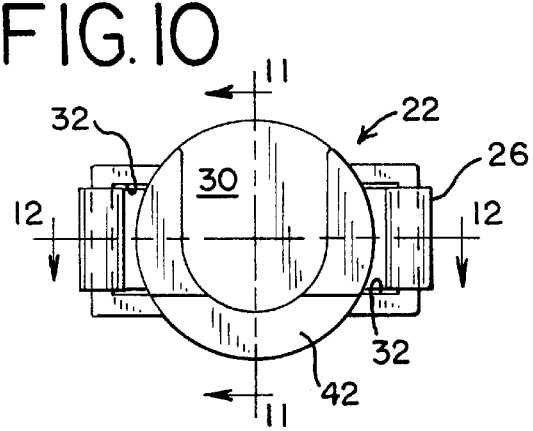
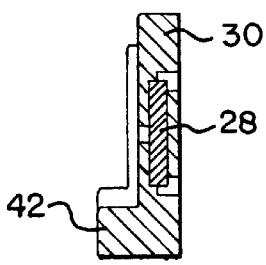
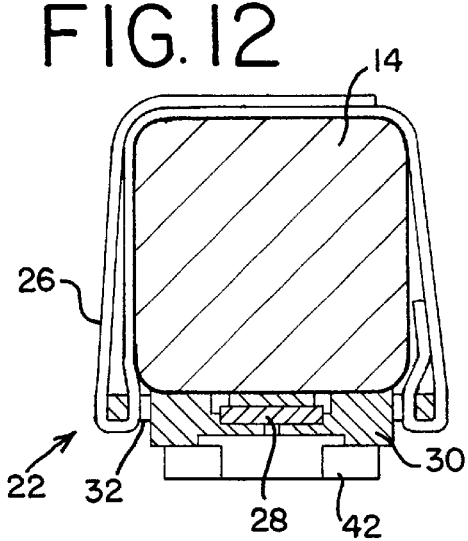
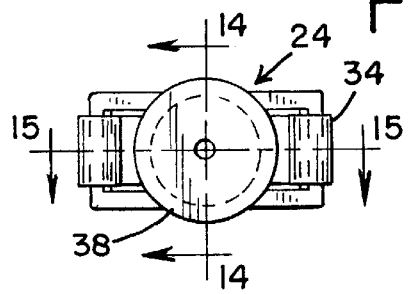
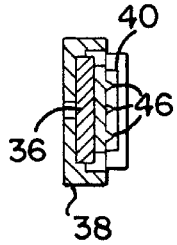
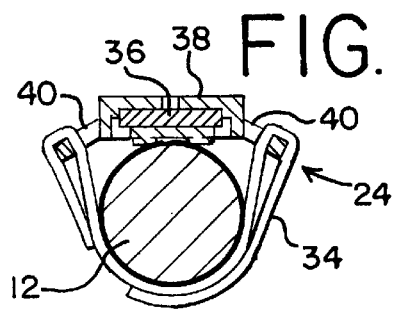

GOLF CART CIGAR HOLDER

CROSS REFERENCE TO RELATED APPLICATION

The present application is a continuation-in-part of application Ser. No. 09/568,891, filed May 11, 2000.

BACKGROUND OF THE INVENTION

The present invention facilitates the combination of two different but complimentary activities that are best enjoyed outdoors—golfing and cigar smoking.

The number of public places where one can smoke without risking either violating some law or offending someone is being reduced at a rate some might consider alarming. In fact, in major cities across the country, it is not unusual to see masses of people huddled in or near building doorways in order to smoke their selected tobacco products.

The problem with finding an acceptable place to enjoy a smoke is even more acute for persons who are partial to the stronger and more aromatic cigar and pipe tobaccos. As a consequence, many are finding the golf course to be nearly the ideal place to partake of their favored tobacco products, particularly cigars. The beautiful surroundings, open air, and leisurely pace of the golf game provide a perfect compliment to the peaceful enjoyment of a cigar. However, golf is a game best played with a firm, two-handed grip on the club, thus requiring smokers to find a place of repose for their cigars when engaged in shot making.

Many cigar-smoking golfers will stash their stogies at the first place they think of—usually on the ground near the golf cart or near where the shot is being made. In the excitement of following his shot, the golfer may walk or drive away from his cigar, only to realize maybe several holes later that the treasured Havana has been left behind. Needless to say, that with the high price of fine cigars today, this can be an expensive lesson as well as an annoyance.

Even if the golfer remembers to retrieve his cigar before traveling on to his next shot, the ground is far from the ideal place to set one's cigar. While on the ground, the cigar may become contaminated by any herbicides or pesticides that have been applied to the turf. Further, if the turf is wet from rain, heavy dew, or watering, the cigar can become wet which makes it more difficult to keep the cigar lit and burning evenly. Further, the integrity of the outer wrapper leave of the cigar may well be compromised if it becomes excessively moist.

Accordingly, it is an object of the present invention to provide a system for holding a cigar or the like while making a golf shot.

More specifically, it is an object of the present invention to provide a cigar holder that keeps the cigar off the ground and prevents the golfer from leaving his cigar behind as he advances to follow his shot.

It is a further object to provide a cigar holder that removably secures the cigar to a structural member of a golf cart.

SUMMARY OF THE INVENTION

These objects, as well as others which will become apparent upon reference to the following detailed description and accompanying drawings, are accomplished by a system for removably securing a cigar to a structural member of a golf cart that includes a first strap that carries a first metallic member and includes a fastener for cinching down the first strap so as to releasably secure it to the golf cart. A second strap is provided that has a second metallic member secured thereto and includes a fastener for cinching down the second strap to releasably secure it to the cigar. The fasteners for the first and second straps may be Velcro, a releasable adhesive, a buckle, or the like.

At least one of the first or second metallic members is magnetized and the other is of a metal that is magnetizable, so that when the first strap is secured to the golf cart and the second strap is secured to the cigar, the cigar can be firmly, but removably, secured to the golf cart due to the attraction between the first and second metallic members.

The first and second straps may also include support members for carrying the respective metallic members, and the first support member may include a projection shape to receive the second support member. Preferably, the projection of the first support member and the second support member have complimentary shapes so as to provide a physical interlock between the first support member and the second support member in addition to the magnetic attraction between the first and second metallic members.

BRIEF DESCRIPTION OF THE FIGURES OF THE DRAWINGS

FIG. 4 is a plan view of the portion of the cigar holder according to the present invention that is secured to the cigar.

FIG. 5 is a top view of the cigar holder of FIG. 4.

FIG. 6 is a cross-sectional view of the cigar holder of FIG. 4 taken along lines 6—6 of FIG. 4.

FIG. 7 is an enlarged view showing a cigar held to a golf cart structural member by the cigar holder of the present invention, with portions of the cigar holder being shown in cross-section.

FIG. 8 is a perspective view of a second embodiment of a cigar holder according to the present inventions.

FIG. 9 is a perspective view of a third embodiment of a cigar holder according to the present invention.

FIG. 10 is a plan view of the portion of the cigar holder of FIG. 8 that is secured to the structural member of the golf cart.

FIG. 11 is a cross-sectional view of the portion of the cigar holder of FIG. 10 taken along lines 11—11 of FIG. 10.

FIG. 12 is cross sectional view of the portion of the cigar holder of FIG. 10 taken along lines 12—12 of FIG. 10 and also showing the golf cart structural member in cross-section.

FIG. 13 is a plan view of the portion of the cigar holder of FIGS. 8 or 9 that is secured to the cigar.

FIG. 14 is a cross-sectional view of the portion of the cigar holder of FIG. 13 taken along lines 14—14 of FIG. 13.

FIG. 15 is a cross sectioned view of the portion of the cigar holder of FIG. 13 taken along lines 15—15 of FIG. 13 and also showing the cigar in cross-section.

DETAILED DESCRIPTION OF THE PREFERRED EMBODIMENTS

Figure 1:
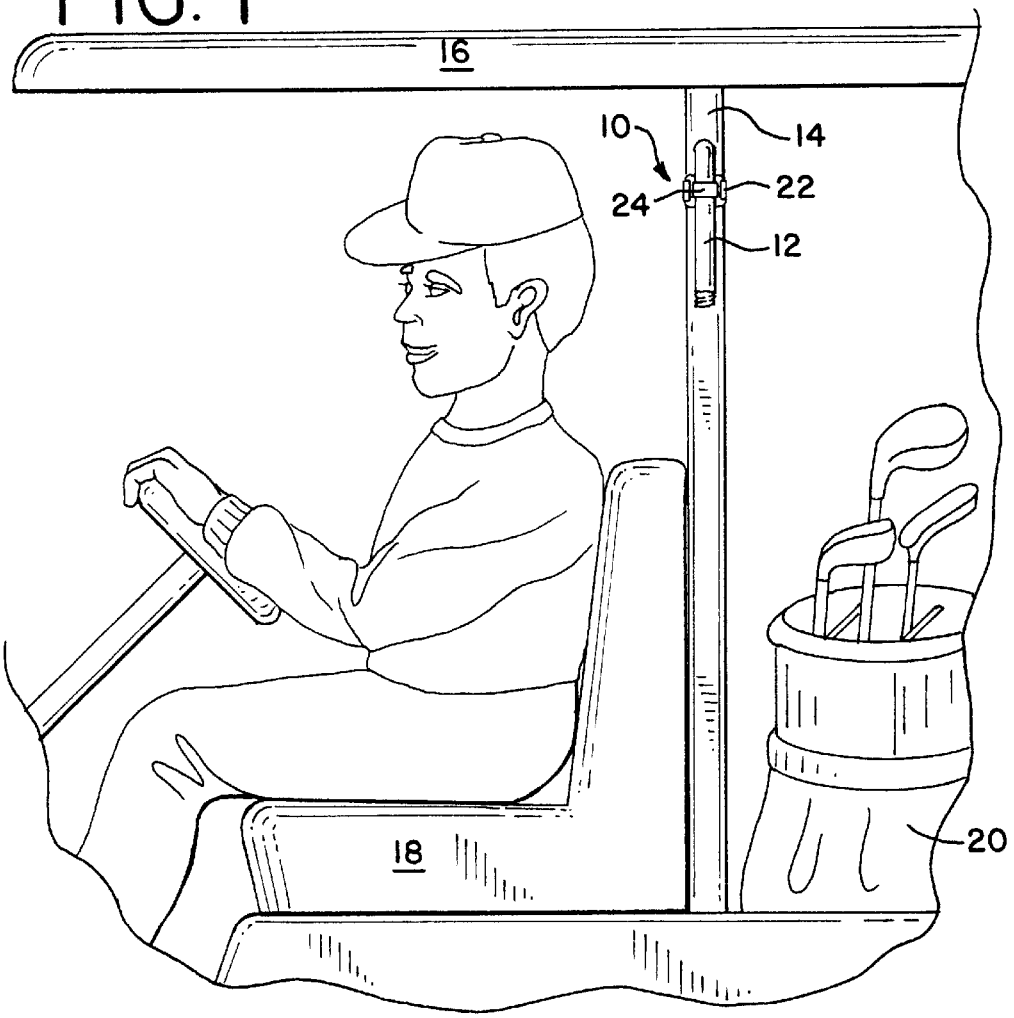
FIG. 1 is a fragmentary view of a golf cart employing the cigar holder of the present invention.

Turning to FIG. 1, there is seen a cigar holder, generally indicated by 10, in accordance with the present invention.

The cigar holder 10 secures a cigar 12 to a structural support member 14 for the canopy 16 of a golf cart 18. The cigar holder 10 is conveniently located near the compartment of the cart 18 in which the golfer's bag of clubs 20 is stored, thus providing easy access to the cigar holder immediately before a club is selected for shot making and after the club is returned to the golf bag 20.

Figure 2:
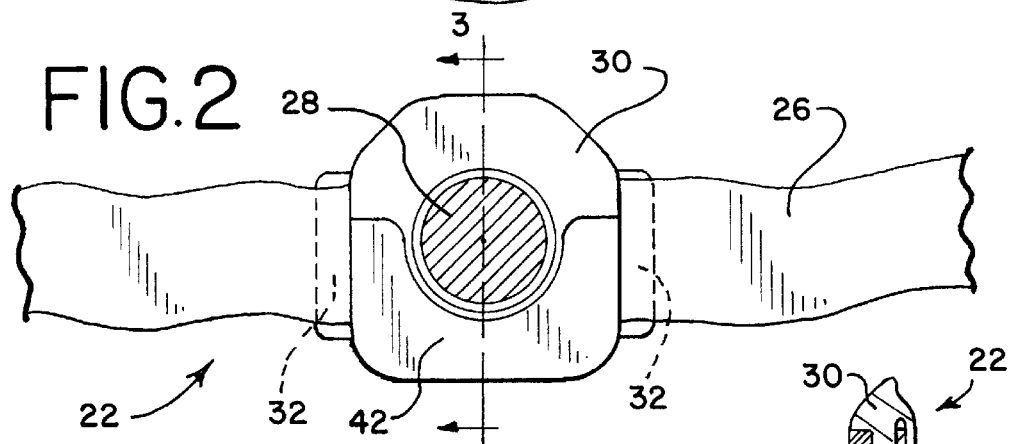
FIG. 2 is a plan view of the portion of the cigar holder system that is secured to the structural member of the golf cart.
Figure 3:
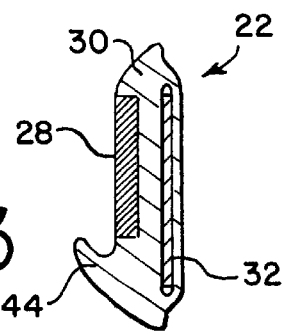
FIG. 3 is a cross-sectional view of the cigar holder of FIG. 2 taken along lines 3—3 of FIG. 2.

The cigar holder 10 comprises two separate parts, one part 22 is associated with the golf cart or other object to which the cigar is to be held, and the other part 24 is associated with the cigar 12. As best seen in FIGS. 2, 3 and 7, the portion 22 of the cigar holder 10 includes a strap 26 sized in length to easily fit around the circumference of the canopy support 14. The strap 26 is configured to be cinched down and fastened to the support 14. To this end, the strap is preferably made of a fabric having Velcro-type hook and loop fasteners on its opposite sides so that the strap fastens to itself when wrapped around the canopy support 14. Alternatively, the strap 26 may fasten to the support 14 by means of a releasable adhesive applied to the strap, or by a buckle, neither of which are shown.

A metallic disk 28 is secured to the strap 26 by means of a mounting member 30. The mounting member 30 may be made of plastic and formed by well-known injection molding processes. Preferably, the support member 30 is formed so as to have opposed elongated slots 32 sized to slidingly receive the strap 26, thus permitting the strap 26 to be easily replaced, if required. In the absence of a mounting member 30, the metallic disk 28 may be secured directly to the strap 26 by, e.g., adhesive.

With reference to FIGS. 4–7, the second part 24 of the cigar holder also comprises a strap 34 that is sized in length to encircle the cigar 12. The strap 34 is similar to strap 26 in that it is configured to be cinched down and fastened to the cigar 12, and is also preferably made of a Velcro-type fabric so that it fastens to itself. Again, alternative fasteners such as releasable adhesives or buckles may be used.

A metallic disk 36 is also associated with the strap 34 and may be carried on the strap 34 by a mounting member 38. Again, the mounting member 38 is preferably made of injection molded plastic and, like mounting member 30, may include opposed elongated slots 40 for slidably receiving the strap 34. In the absence of a mounting member 38, the metallic disk 36 may be secured directly to the strap 34 by adhesive.

In keeping with the invention, strap 34 is adapted to be removably secured to strap 26 so that the cigar 12 can be attached to the golf cart canopy support 14 during shot making. To this end, at least one of the metallic disks 28, 36 is magnetized, with the other being magnetizable so that the magnetic attraction between the two disks 28, 36 is sufficient to firmly, but releasably, hold the cigar-holding strap 34 to the strap 26 attached to the cart. Preferably, both disks 28 and 36 are magnets.

In order to insure that the magnetic bond between the two strap members is not broken by cart vibration when, e.g., driving over rough ground, the mounting member 30 may be formed with a U-shape projection 42 (best seen in FIG. 2) that is undercut to form an upwardly-projecting lip 44 (best seen in FIGS. 3 and 7). The mounting member 38 associated with the cigar has a shape complimentary to the lip 44 so that additional support for the cigar is provided when secured to the cart.

In order to insure that the cigar 12 does not slip out of the strap 34, the back side of the strap 34 may be provided with a short pointed tooth or series of teeth 46 that bite into the cigar. As illustrated, three such teeth 46 are formed on the back side of the mounting member 38.

Turning to FIGS. 8 and 10–15 there is seen a second embodiment of a cigar holder 10 according to the present invention, while FIG. 9 shows a third embodiment. Identical reference numbers to those used in conjunction with FIGS. 1–7 are used for the corresponding elements of the embodiments of FIGS. 8–15.

The embodiments of FIGS. 8–15 differ from that of FIGS. 1–7 in several respects. First, the metallic disk 28 associated with the cart-mounted member 30 and the metallic disk 36 associated with the cigar-mounted member 38 are encased in their respective mounting members, rather than being on the surface of the mounting members. This serves to protect the metallic members from the environment and, should there be any corrosion of the metallic members 28, 36, reduces the likelihood of contamination of the cigar 12 or staining of the golf cart structural member 14.

Further, with reference to FIG. 9, the cart-mounted member may also have a rigid placard 50 integral therewith. The placard 50 may be used for displaying identifying information about the golfer or his country club, or for carrying advertising, sponsorship or other promotional messages. Alternatively, the placard can be configured to hold other golf accessories, such as golf tees.

Thus, a cigar holder has been provided that meets all the objectives of the present invention. While the cigar holder has been described in conjunction with a golf cart, it is understood that it has applicability to other activities requiring the use of both hands, and that the cigar may be thus secured to any structural member to which the strap 26 can be secured. While the invention has been described in terms of its preferred embodiment, there is no intent to limit it to the same. Instead, the invention is defined by the following claims.

What is claimed is:

1. A system for removably securing a cigar or other smoking implement to a structural member of a golf cart comprising:
   a first strap including a first mounting member slidably received thereon, a first metallic member encased by the first mounting member, and a first fastener to releasably secure the first strap to the golf cart;
   a second strap including a second mounting member slidably received thereon, a second metallic member encased by the second mounting member, and a second fastener to releasably secure the second strap to the cigar; and
   at least one of said first and second metallic members being magnetized and the other of said first and second metallic members being of a metal that is magnetizable, so that when the first strap is secured to the golf cart and the second strap is secured to the cigar, the cigar can be firmly, but removably secured to the golf cart due to the magnetic attraction between the first and second metallic members.

2. The system of claim 1 wherein the first mounting member includes a projection shaped to receive the second mounting member, the projection of the first mounting member and the second mounting member having complimentary shapes so as to provide a physical interlock between the first mounting member and the second mounting member.

3. The system of claim 1 wherein the first and second metallic members are both magnets.

4. The system of claim 1 wherein the first and second fasteners comprise hook and loop fasteners.

5. The system of claim 1 wherein the first and second fasteners comprise a releasable adhesive.

6. The system of claim 1 wherein the second strap includes at least one short pointed projecting member sized in length to penetrate into the cigar.

7. The system of claim 1 wherein the second strap further comprises a series of pointed teeth for engaging the cigar to form a more secure hold between the second strap and the cigar.

8. A system for removably securing a cigar or other smoking implement to a structural member of a golf cart comprising:
- a first strap including a first mounting member, a first metallic member encased by the first mounting member, and a first fastener to releasably secure the first strap to the golf cart, the first mounting member having a placard integral therewith;
- a second strap including a second mounting member, a second metallic member encased by the second mounting member, and a second fastener to releasably secure the second strap to the cigar; and
- at least one of said first and second metallic members being magnetized and the other of said first and second metallic members being of a metal that is magnetizable, so that when the first strap is secured to the golf cart and the second strap is secured to the cigar, the cigar can be firmly, but removably secured to the golf cart due to the magnetic attraction between the first and second metallic members.

9. The system of claim 8 wherein the first mounting member includes a projection shaped to receive the second mounting member, the projection of the first mounting member and the second mounting member having complimentary shapes so as to provide a physical interlock between the first mounting member and the second mounting member.

10. The system of claim 8 wherein the first and second mounting members are slidingly received on the first and second straps.

11. The system of claim 8 wherein the first and second metallic members are both magnets.

12. The system of claim 8 wherein the first and second fasteners comprise hook and loop fasteners.

13. The system of claim 8 wherein the first and second fasteners comprise a releasable adhesive.

14. The system of claim 8 wherein the first and second fasteners comprise buckles.

15. The system of claim 8 wherein the second strap includes at least one short pointed projecting member sized in length to penetrate into the cigar.

16. The system of claim 1 wherein the projection on the first mounting member is undercut to provide an upward-projecting lip.

17. A system for removably securing a cigar or other smoking implement to a structural member of a golf cart, comprising:
- a first strap including a first metallic member secured to the strap and a first fastener to releasably secure the first strap to the structural member;
- a second strap including a second metallic member secured to the second strap and a second fastener to releasably secure the second strap to the cigar, the second strap including at least one short pointed projecting member sized in length to penetrate into the cigar;
- at least one of said first or second metallic members being magnetized and the other of said first and second metallic members being of a metal that is magnetizable, so that when the first strap is secured to the golf cart and the second strap is secured to the cigar, the cigar can be firmly, but removably secured to the structural member due to the magnetic attraction between the first and second metallic members.

18. The system of claim 17 wherein the first and second metallic members are secured to the first and second straps by adhesive.

* * * * *